United States Patent [19]

Itoh

[11] Patent Number: 5,315,087
[45] Date of Patent: May 24, 1994

[54] WIRECUT ELECTRICAL DISCHARGE MACHINE UTILIZING SILICON POWDER SUSPENDED IN A DIELECTRIC MATERIAL

[75] Inventor: Tetsuro Itoh, Rolling Meadows, Ill.

[73] Assignee: Mitsubishi Denki Kabushiki Kaisha, Tokyo, Japan

[21] Appl. No.: 844,182

[22] Filed: Mar. 2, 1992

[51] Int. Cl.$^5$ .......................... B23H 7/02; B23H 1/08; B23H 7/08

[52] U.S. Cl. .................. 219/69.12; 219/69.14

[58] Field of Search ..................... 219/69.14, 69.12

[56] References Cited

U.S. PATENT DOCUMENTS

| | | | |
|---|---|---|---|
| 4,251,706 | 2/1981 | Frei et al. | 219/69.14 |
| 4,392,042 | 7/1983 | Inoue | 219/69.12 |
| 4,673,790 | 6/1987 | Sawada et al. | 219/69.12 |
| 4,739,143 | 4/1988 | Sakai et al. | 219/69.12 |
| 4,762,974 | 8/1988 | Kern | 219/69.12 |
| 4,778,973 | 10/1988 | Derighetti et al. | 219/69.12 |
| 5,013,432 | 5/1991 | Martinez-Mugica | 219/69.14 |
| 5,189,276 | 2/1993 | Magara | 219/69.14 |

FOREIGN PATENT DOCUMENTS

| | | | |
|---|---|---|---|
| 54-6186 | 1/1979 | Japan | 219/69.12 |
| 60-80524 | 5/1985 | Japan | 219/69.14 |
| 2-83119 | 3/1990 | Japan | 219/69.14 |
| 787731 | 12/1957 | United Kingdom | 219/69.14 |

*Primary Examiner*—Geoffrey S. Evans
*Attorney, Agent, or Firm*—Sughrue, Mion, Zinn, Macpeak & Seas

[57] ABSTRACT

A wirecut electrical discharge machining apparatus having silicon particles suspended in a dielectric solution that fills the machining gap. The silicon particles may be suspended in the dielectric solution prior to a machining operation or they may be mixed with the dielectric solution directly in the machining gap. Also, a silicon-coated electrode may be utilized. The silicon overcomes many of the limitations associated with conventional dielectric solutions, by allowing more uniformity of conductivity.

11 Claims, 3 Drawing Sheets

FIG.2d  $G_3 \approx G_4$

FIG.2c  $G_1 < G_2$

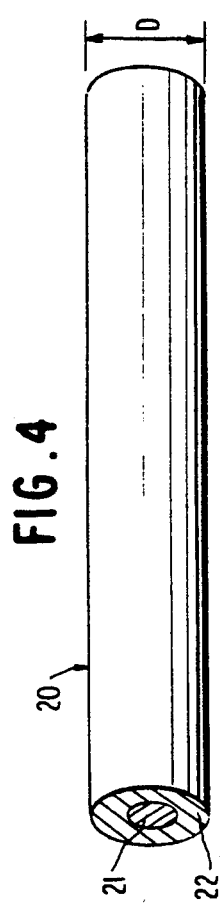
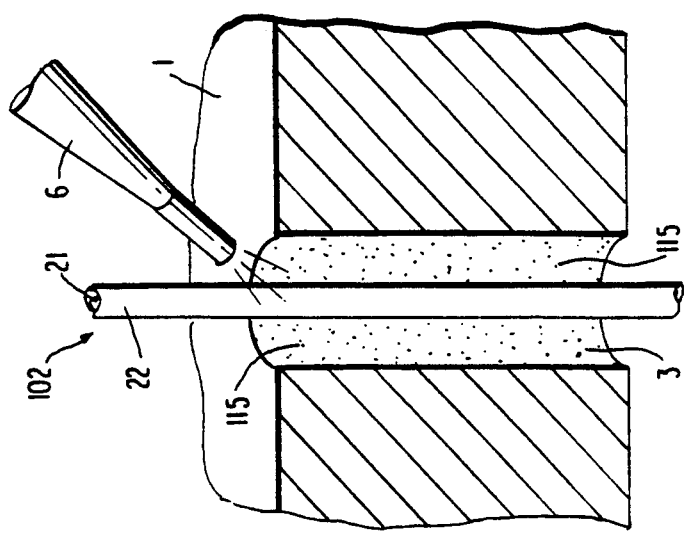
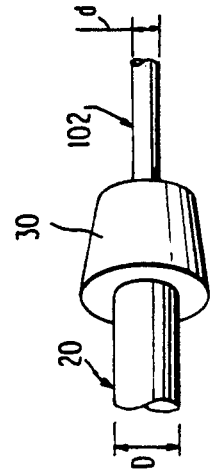
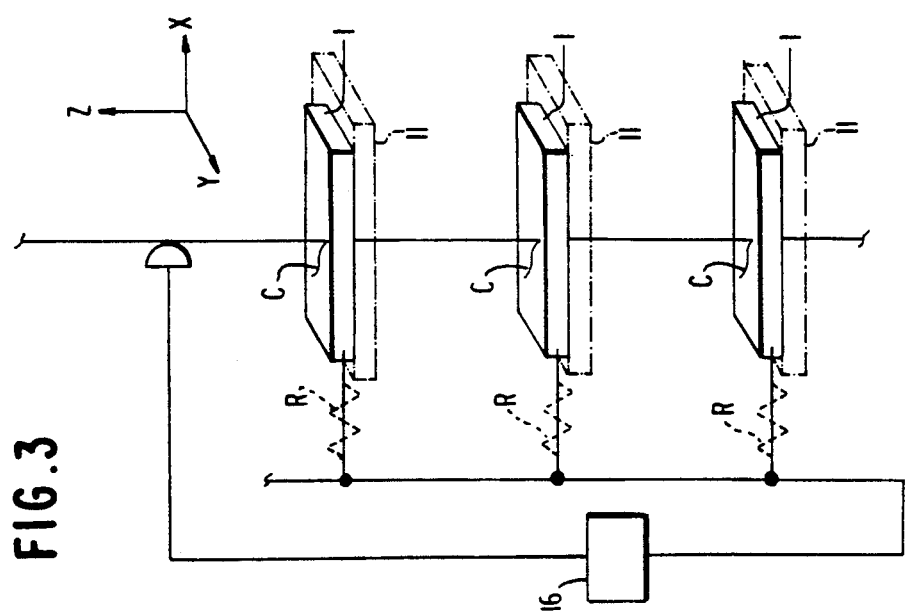

WIRECUT ELECTRICAL DISCHARGE MACHINE UTILIZING SILICON POWDER SUSPENDED IN A DIELECTRIC MATERIAL

BACKGROUND OF THE INVENTION

1. Field of the Invention

The present invention relates to a wirecut electrical discharge machine (EDM) for machining a workpiece using a wire electrode. In particular, the invention is a wirecut EDM utilizing a silicon powder in the dielectric to promote even electrical discharge so as to improve machining quality.

2. Description of the Related Art

Wirecut electrical discharge machines which employ a metal wire of approximately 0.05 to 0.3 mm in diameter as an electrode are well known. The electrode, which extends in a Z direction, is moved in X and Y directions relative to a workpiece so as to perform a machining operation on the workpiece due to electrical discharge energy generated between the electrode and the workpiece by a source of current.

In order to facilitate the electrical discharge, a dielectric fluid, such as water, is placed in a gap between the electrode and the workpiece. However, several disadvantages are present in such a system. Water becomes ionized when energy is passed through it by virtue of electrical discharge. Because of this ionization, arcs tend to be concentrated and not uniformly distributed across a workpiece. Also, a high conductivity sludge, consisting of particles machined from the workpiece, tends to collect around the area being machined. This phenomenon increases the conductivity of the dielectric where the sludge resides, and causes a greater proportion of the electrical discharge to occur at this location. The result is that more machining takes place midway through the workpiece in the thickness direction and a consistent cut or contour cannot be imparted to the workpiece. In addition, concentrated arcing tends to heat up the electrode at the portion thereof and increases the likelihood of breaking the electrode.

Kerosene and other petrochemicals have been utilized as a dielectric medium in an EDM process in an attempt to avoid ionization and create a more uniform distribution of electrical discharge along the workpiece. However, due to the relatively low conductivity of such media, the gap between the workpiece and the electrode must be very small. This introduces problems with breakage of the electrode due to contact with the workpiece as a result of vibrations and electric field forces inherent in the system. In addition, contact between the electrode and the workpiece adversely affects the quality of machining done to the workpiece.

Many conventional wirecut EDM systems utilize a single electrode for machining a number of identical workpieces that are arranged in parallel to each other. However, with such an arrangement, with water utilized as a dielectric, when an arc is developed at one workpiece, the voltage between the electrode and the other workpieces may be reduced to a point below the discharge voltage needed to accomplish machining, typically about 30 v. Accordingly, resistors are arranged in series with each workpiece so as to maintain an adequate voltage between each workpiece and the electrode. Since these resistors must have very high power ratings, such an arrangement adds considerable initial expense and maintenance costs to an EDM apparatus. Of course, if petroleum-based dielectrics are utilized, the above-mentioned limitations again become apparent, i.e., the low conductivity requires an undesirably small machining gap.

It is known that the use of silicon in the dielectric and electrode of EDM systems, other than the wirecut type, will increase surface hardness and corrosion resistance of a workpiece. Such a surface treatment is discussed in *Progress of Electrical Discharge Machining*, by Dr. Nagao Saito. However, it has not been previously proposed to utilize silicon in the dielectric of a wirecut EDM so as to facilitate the machining process.

SUMMARY OF THE INVENTION

The present invention eliminates the above-mentioned problems associated with conventional EDM devices by utilizing silicon particles to facilitate even electrical discharge between the electrode and a workpiece. The use of silicon causes the arcs between the electrode and the workpiece to be random and evenly distributed in part because the conductivity of a dielectric containing silicon is higher than the same dielectric without silicon. Also, the use of silicon allows dielectrics such as kerosene to be used while still maintaining an adequate gap between the electrode and workpiece. This is so because the use of silicon increases the conductivity of the dielectric so that the gap can be larger. In addition, multiple workpieces can be machined at the same time without the need for expensive resistor arrangements to maintain adequate discharge voltages.

In first and second preferred embodiments, the invention utilizes silicon particles suspended in the dielectric solution. A second preferred embodiment utilizes a wire coated with silicon as an electrode. In both preferred embodiments, silicon will migrate through the dielectric into the cut surface of the workpiece so as to also increase the surface hardness and corrosion resistance of the workpiece.

The invention will be described below through the preferred embodiments with reference to the attached drawings.

BRIEF DESCRIPTION OF THE DRAWINGS

FIGS. 2c and 2d compare the conventional machining process with that of the prior art;

FIG. 3 illustrates the second preferred embodiment;

FIGS. 4 and 5 illustrate the method of construction of the electrode of the third preferred embodiment; and FIG. 6 illustrates the machining gap of the third preferred embodiment.

DETAILED DESCRIPTION OF THE PREFERRED EMBODIMENTS

Figure 1:
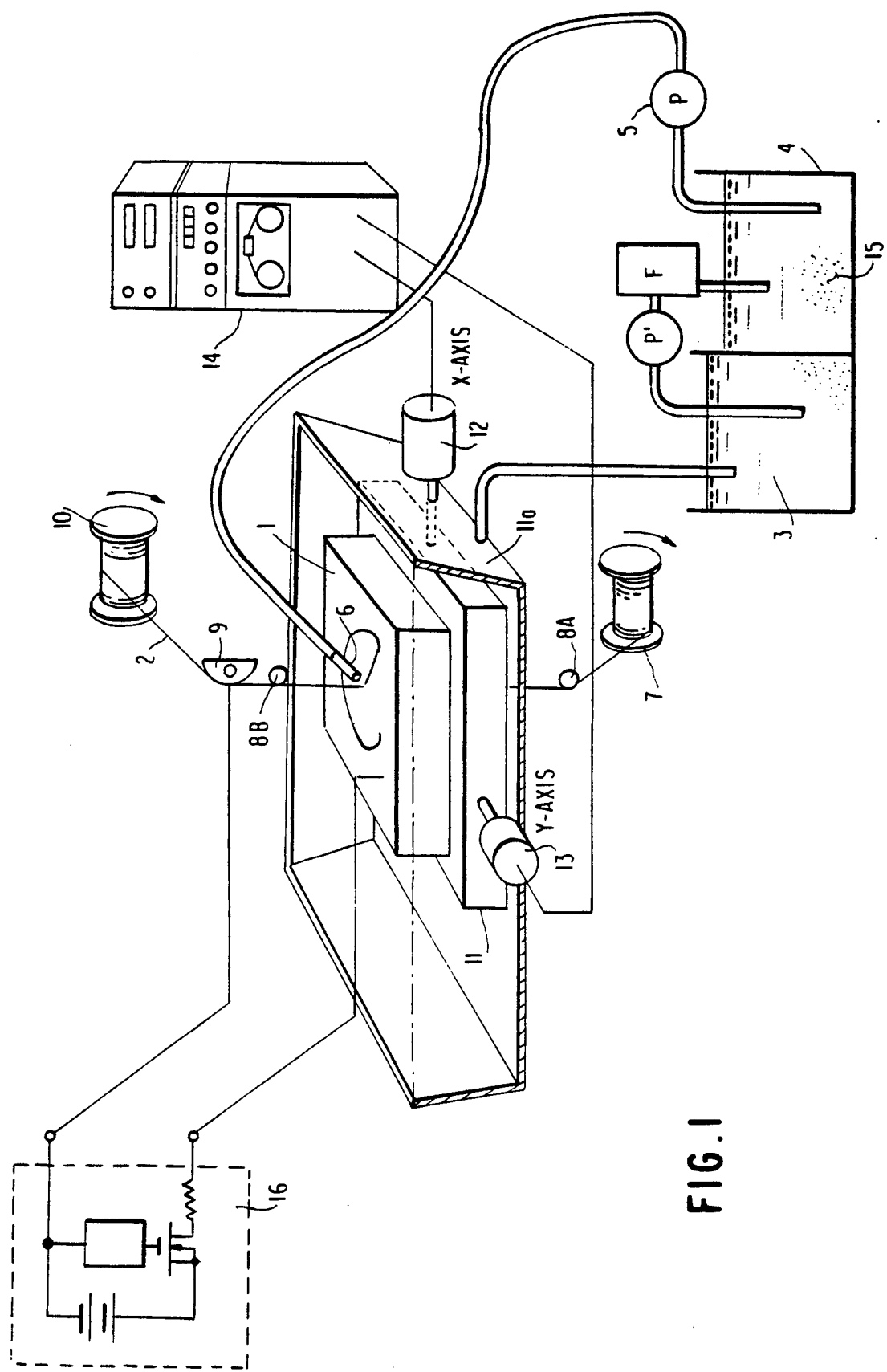
FIG. 1 illustrates the first preferred embodiment.

FIG. 1 Illustrates the first preferred embodiment of the invention. Workpiece 1 is fixed to X-Y table 11 within tank 11a in order to be subjected to a machining process, such as cutting or contouring for example. X-Y table 11 can be moved, in a precise manner, in the X and Y directions, by servo devices 12 and 13 respectively, so as to move workpiece 1 according to a desired program stored in controller 14.

Initially, a small hole is formed in workpiece 1 by a conventional drilling process, or the like. Electrode 2, in the form of a wire, is passed through the hole in workpiece 1 and through a larger opening (not illustrated) in a central portion of X-Y table 11. Electrode 2, originally stored on feed spool 7, is fed around roller 8A, through the above-mentioned openings in X-Y table 11 and workpiece 1, around roller 8B and onto take-up spool 10. Rollers 8A and 8B maintain the wire position while spool 7 serves to maintain adequate tension on electrode 2.

Machining current source 16 provides a potential difference between electrode 2 and workpiece 1. One pole of voltage source 16 is electrically connected with workpiece 1 and the other pole is electrically connected to electrode 2 by virtue of brush or similar connection 9. Dielectric container 4 holds dielectric solution 3 having silicon particles 15 suspended therein. Dielectric solution 3 may be water, kerosene or any other solution having desirable characteristics. Dielectric solution 3 can be supplied, along with silicon particles 15, to a gap between workpiece 1 and electrode 2 by virtue of pump 5 and nozzle 6.

In operation, source 16 is activated and electrode 2 is pulled onto take-up spool 7 so as to continuously provide a new portion of electrode 2 to a machining position. Simultaneously, dielectric solution 3, having silicon particles 15 suspended therein, is pumped, through nozzle 6, by pump 5. Nozzle 6 is designed so as to provide a uniform or other programmed flow of dielectric solution 3 and silicon particles 15 to a gap between electrode 2 and workpiece 1. Of course more than one nozzle may be utilized so as to provide the dielectric solution 3 to the machining gap, or nozzles may be located in upper and/or lower die guides for the wire. Further, workpiece 1 may be immersed in a bath of dielectric solution. Dielectric fluid exists the tank 11a and passes to a "dirty" side of tank 4, where it is pumped by pump P' through a filter F which may include ion exchange resins for capturing positive ions. Cleaned dielectric from the filter is pumped by pump 5 to nozzle 6.

Figure 2A:
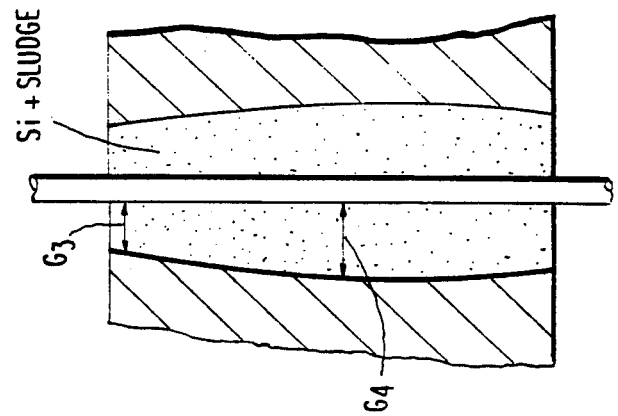
FIGS. 2a and 2b illustrate the machining gap of the first embodiment.
Figure 2A:
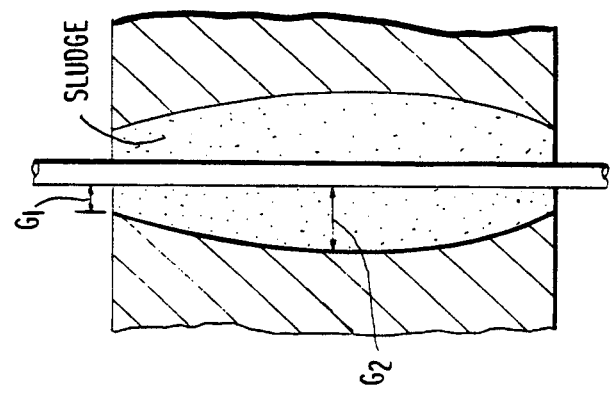
Figure 2A:
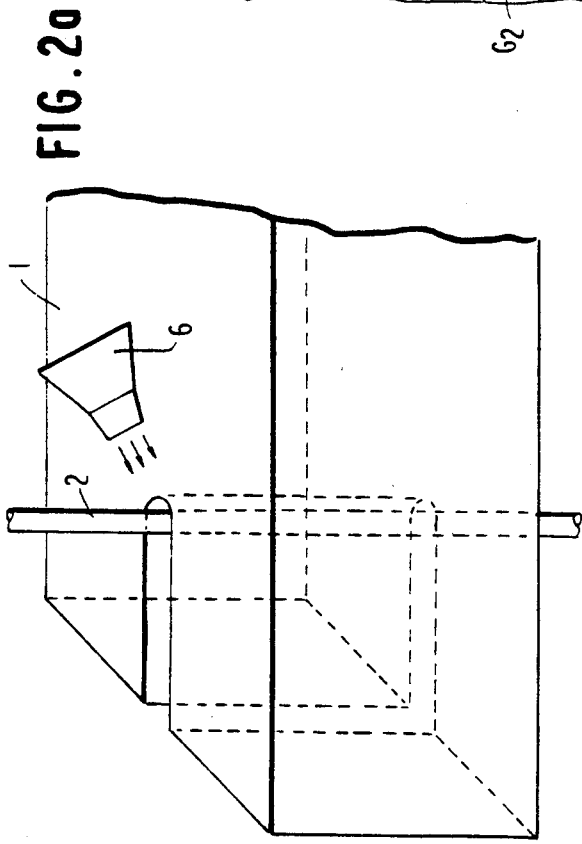
Figure 2B:
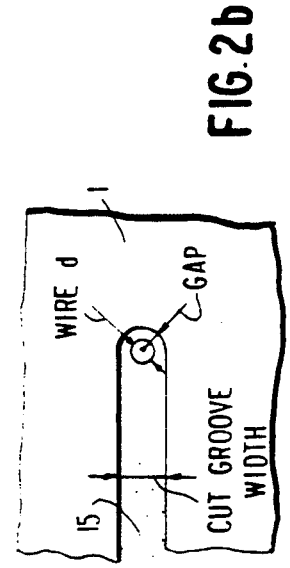

FIG. 2a and 2b illustrate the machining gap between electrode 2 and workpiece 1. It can be seen that, during operation, the gap is filled with dielectric solution 3 having silicon particles 15 suspended therein. Due to the electrical potential difference applied by voltage source 16, preferably between 70 and 300 V, electrical discharge will occur across the gap. The potential difference is adjusted so as to cause a desired amount of material to be removed from the workpiece due to the energy of the electrical discharge. The workpiece can then be moved, by virtue of X-Y table 11 and servo devices 12 and 13, according to a program stored in controller 14, so as to accomplish the desired machining process.

The use of silicon particles 15 increases the conductivity of the dielectric solution. The result of having the particles in solution is that arcing between electrode 2 and workpiece 1 will occur at positions more widely distributed over the entire surface area of workpiece 1 that is opposite electrode 2. This causes the machining process to be more even and finer than a conventional wirecut EDM process. Even where conductive sludge accumulates, the difference in conductivity between one area and the next is lessened considerably as compared to the prior technique. In the case of the conventional dielectric, as shown in FIG. 2C (showing the problem occurring in the conventional art), the increased amount of machining which occurs at locations of higher sludge concentration (typically in the interior portions of the workpiece in the thickness direction) is evident from the disparity in gap widths. On the other hand, in FIG. 2B, the case where the dielectric according to the invention is employed, is shown, and it can be seen that the gap widths at different locations of the cut are much more nearly equal. In addition, media having a low conductivity can be utilized as dielectric solution 3 because silicon particles 15 raise the conductivity to a desired level. Of course, the conductivity can be adjusted by varying the amount and size of silicon particles 15 suspended in dielectric solution 3 and the type of material utilized as dielectric solution 3.

FIG. 3 illustrates a second preferred embodiment of the invention. In this embodiment, three workpieces 1 are each mounted on the same or separate X-Y tables 11. Electrode 2 is passed through each workpiece and associated X-Y table in the same manner as in the first preferred embodiment. Each of the X-Y tables can be moved in the X and Y directions in concert with each other in a manner similar to that of the first preferred embodiment. Accordingly, a cut C can be simultaneously made in all three workpieces 1 in an identical manner by a wirecut EDM process that is similar to that of the first preferred embodiment including the use of silicon chips 15 suspended in dielectric solution 3. Of course, the tables may be individually controlled such that the cut C in each workpiece is different. The workpieces are electrically connected in parallel as shown in FIG. 3.

The second preferred embodiment exhibits the same advantages as the first preferred embodiment. In addition, in the second preferred embodiment, there is no need for an expensive resistor arrangement (shown in phantom in FIG. 3, at "R") to be installed in series with each workpiece 1 in order to maintain an adequate machining potential between each workpiece 1 and electrode 2. This is so because the silicon provides a uniform resistance, between each workpiece 1 and electrode 2, so as to maintain an adequate electrical potential (in the range of 100 V) and thus facilitate arcing in each machining gap. If water is used as the dielectric solution 3 without silicon chips 15, a suitable arc voltage cannot be maintained at plural points without other measures (such as resistors) being necessary, as explained above.

FIG. 6 illustrates a third preferred embodiment of the invention. In this embodiment, components identical to those of the first embodiment are labeled with like reference numerals and will not be described further. The significant difference between the third embodiment and those described above is in the way that the silicon is used. Instead of necessarily utilizing a dielectric that has silicon suspended therein, as in previous embodiments, electrode 102 consists of a core material coated with silicon. This electrode 102 can also be used in combination with a dielectric having a silicon suspension.

When electrical discharge occurs across the machining gap, the silicon operates to increase the effective conductivity while it is disposed in the machining gap. This facilitates electrical discharge much like the arrangement of the first preferred embodiment and has similar advantages over conventional processes. Erosion of the silicon coating in the course of machining results in silicon particles 115 in the gap, to like effect as in the preceding embodiments. Silicon will normally be lost from the coating as a result of the high corrosiveness and high temperature of the discharge environment.

FIGS. 4 and 5 illustrate a method of construction of electrode 102 of the third preferred embodiment. Core 21, constructed of brass or any other electrically conductive material with high tensile strength, has a coating 22, formed from at least commercial grade silicon powder, deposited thereon. This arrangement of core 21 and coating 22 constitutes wire 20. The diameter of core 21 is up to 0.5 mm and preferably between 0.1 and 0.3 mm. Of course the application of coating 22 increases diameter D of wire 20 to a value greater than 0.1 to 0.3 mm (see FIG. 4).

In order to transform wire 20 into electrode 102 that is usable in an EDM apparatus, wire 20 is drawn through one or more dies 30 so as to reduce its diameter. Electrode 102 which results from the drawing process has a diameter d that is between 0.02 and 0.5 mm, and preferably up to 0.33 mm, and still more preferably between 0.1 and 0.3 mm (see FIG. 5).

A silicon coated wire can carry high current densities, like the known zinc coated wires, but does not suffer from the problems associated with the latter wires caused by ionization of the zinc in the gap region.

While the invention has been described in relation to preferred embodiments, it will apparent to those skilled in the art that various modifications may be made to these embodiments without departing from the scope of the invention as defined by the appended claims. For example, the silicon coated electrode of the third preferred embodiment may be utilized in combination with the silicon suspension of the other embodiments. Also, various materials may be utilized as core 21 in the third embodiment. Finally, other methods may be utilized to supply the silicon to the machining gap. For example, silicon particles may be supplied to the dielectric solution in the machining gap through a separate nozzle.

What is claimed:

1. A wirecut electrical discharge machining apparatus for machining a workpiece, comprising:
   a wire electrode that passes proximate the workpiece so as to define a gap therebetween;
   a voltage source electrically connected to said electrode and the workpiece so as to create an electrical potential between said electrode and the workpiece;
   a container holding a dielectric solution therein;
   means for supplying said dielectric solution to said gap; and
   silicon particles disposed in said gap so as to facilitate electrical discharge between said electrode and the workpiece, energy due to said electrical discharge removing portions of the workpiece so as to accomplish a desired machining process on the workpiece.

2. A wirecut electrical discharge machining apparatus as claimed in claim 1, wherein said silicon particles are suspended in said dielectric solution when said dielectric solution is in said container.

3. A wirecut electrical discharge machining apparatus as claimed in claim 1, wherein said electrode comprises:
   an electrically conductive core having a silicon coating thereon.

4. A wirecut electrical discharge machining apparatus as claimed in claim 1, further comprising:
   a movable table;
   at least one servo device operatively engaged with said table;
   a controller for controlling said servo device according to a predetermined program;
   said workpiece being fixedly attached to said table, and said controller commanding said servo device to move said table during a machining process so as to impart a desired shape to said workpiece.

5. A wirecut electrical discharge machining device as claimed in claim 4, further comprising:
   a plurality of auxiliary tables;
   an auxiliary workpiece fixedly mounted on each of said auxiliary tables;
   said electrode passing proximate each of said auxiliary workpieces so as to accomplish a same or different machining operation on said workpiece and said auxiliary workpieces simultaneously;
   said auxiliary workpieces being electrically connected to said workpiece in parallel.

6. A wirecut electrical discharge machining apparatus as claimed in claim 1, further comprising:
   means for storing said silicon particles;
   means for conveying said silicon particles to said gap so as to mix said silicon particles with said dielectric solution in said gap.

7. A wirecut electrical discharge machining apparatus for machining a plurality of workpieces simultaneously, comprising:
   a wire electrode that passes proximate the workpieces so as to define gaps between said electrode and each workpiece;
   a voltage source electrically connected to said electrode and the workpieces so as to create an electrical potential between said electrode and the workpieces;
   a container for holding a dielectric solution;
   means for supplying said dielectric solution to said gaps; wherein
   each of said workpieces is mounted on a corresponding one of a plurality of movable tables, and, during machining, each of said tables is movable independently of the others so that said workpieces may be independently formed in individually unique shapes.

8. A wirecut electrical discharge machining apparatus for machining a workpiece, comprising:
   a wire electrode that passes proximate the workpiece so as to define a gap therebetween, said electrode comprising an electrically conductive core having a silicon coating thereon;
   a voltage source electrically connected to said electrode and the workpiece so as to create an electrical potential between said electrode and the workpiece;
   a container for holding a dielectric solution; and
   means for supplying said dielectric solution to said gap.

9. A wirecut electrical discharge machining apparatus for machining a plurality of workpieces, comprising:
   a wire electrode that passes proximate workpieces so as to define a plurality of gaps between the wire electrode and respective ones of the workpieces;
   a voltage source electrically connected to said electrode and the workpieces so as to create an electrical potential between said electrode and the workpieces, said workpieces being electrically connected in parallel;
   a container for holding a dielectric solution;
   means for supplying said dielectric solution to said gap;

means for introducing silicon particles to said gap so as to facilitate electrical discharge between said electrode and the workpieces, said introducing means comprising a silicon coating disposed on said electrode.

10. A wirecut electrical discharge machining apparatus for machining a plurality of workpieces, comprising:
- a wire electrode that passes proximate workpieces so as to define a plurality of gaps between the wire electrode and respective ones of the workpieces;
- a voltage source electrically connected to said electrode and the workpieces so as to create an electrical potential between said electrode and the workpieces, said workpieces being electrically connected in parallel;
- a container for holding a dielectric solution;
- means for supplying said dielectric solution to said gap;
- silicon particles disposed in said gap so as to facilitate electrical discharge between said electrode and the workpieces;
- a plurality of tables;
- a plurality of servo devices, each of said servo devices being coupled to a respective one of said tables;
- a controller coupled to said servo devices so as to move said tables;
- each of the workpieces being coupled to a respective one of said tables;
- said electrode accomplishing a machining operation, due to said electrical discharge, on each of said workpieces.

11. A wirecut electrical discharge machining apparatus for machining a plurality of workpieces simultaneously, comprising:
- a wire electrode that passes proximate the workpieces so as to define gaps between said electrode and each workpiece;
- one voltage source directly electrically connected to said electrode and the workpieces so as to create an electrical potential between said electrode and each workpiece;
- means for supplying a dielectric solution to said gaps; and
- means for facilitating simultaneous electrical discharge between said electrode and plural ones of said workpieces by introducing silicon particles to said gap.

* * * * *